Oct. 30, 1934.　　　R. J. MARVIN　　　1,978,682
MEASURING INSTRUMENT
Filed May 22, 1931　　2 Sheets-Sheet 1
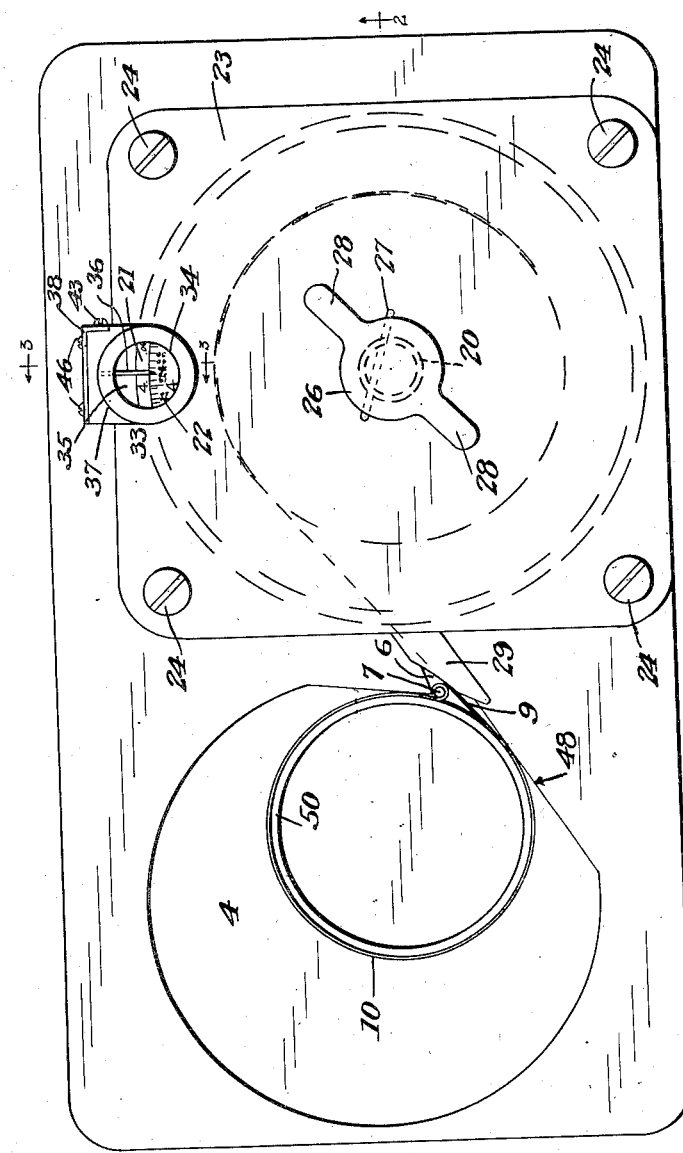

Oct. 30, 1934.   R. J. MARVIN   1,978,682
MEASURING INSTRUMENT
Filed May 22, 1931   2 Sheets-Sheet 2

INVENTOR.
Ralph Jacob Marvin;
BY
Calvin Brown,
ATTORNEY

Patented Oct. 30, 1934

1,978,682

UNITED STATES PATENT OFFICE 1,978,682

MEASURING INSTRUMENT

Ralph Jacob Marvin, Los Angeles, Calif.

Application May 22, 1931, Serial No. 539,267

3 Claims. (Cl. 33—179)

This invention relates to measuring instruments, and more particularly to an instrument for measuring the peripheries of circular objects, such as pistons, piston rings, collars, bushings, pipes, discs and the like.

The general object of the invention is to provide an accurate and efficient measuring instrument for measuring the peripheries of circular objects.

A more particular object is to provide an instrument of the character stated which is simple in construction, protected at vital points, easy to manipulate, readily adjustable, fool-proof, durable and requires no lubrication.

Other objects of the invention will appear as the specification proceeds.

With the above and other objects in view, the invention consists in the novel and useful provision, formation, construction and relative arrangement of parts, members and features, all as shown in certain embodiments in the accompanying drawings, described generally, and more particularly pointed out in the claims.

In the drawings:

Figure 1 is a plan view of my invention,

Figure 2 is a longitudinal section taken on line 2—2 of Figure 1,

Figure 5:
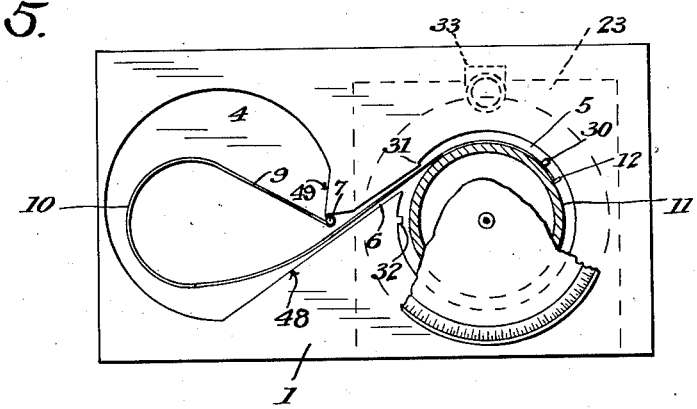
Figure 6:
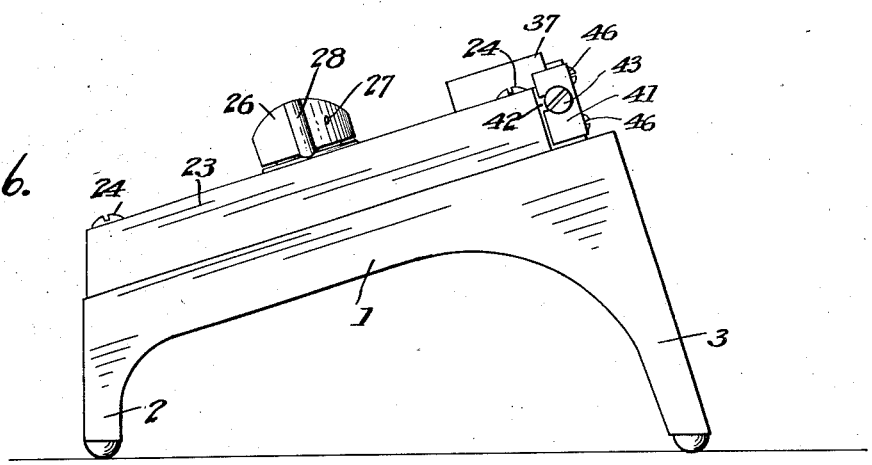
Figure 7:
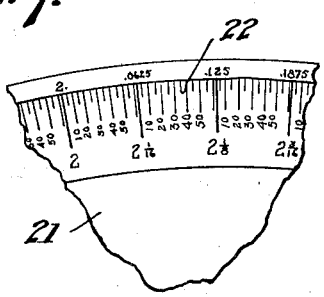

Figure 3 is a fragmentary vertical cross section, taken on line 3—3 of Figure 1, of the measuring indicating means, Figure 4 is an inside view of the indicating needle mounting and adjusting means, Figure 5 is a plan view of my invention with the cover plate removed and certain parts broken away for the purpose of illustration, Figure 6 is an end view of my invention, and, Figure 7 is a fragmentary plan view of the measuring dial.

Referring with particularity to the drawings, 1 designates a base mounted on legs 2 and 3. The legs 3, as illustrated in Figure 6, may be longer than the legs 2, in order to incline the upper face of the base 1 downwardly toward the front side of the base. In the upper face of the base 1 are provided recesses 4 and 5 and a groove 6 connecting said recesses. In the base 1, at the juncture of the recess 4 and the groove 6, adjacent the upper edge of said groove, is located a pin 7, upstanding in said recess and groove from the bottom thereof and secured in the base at 8, and a tape 9 of flexible steel or other suitable material, is coiled at one end around said pin and secured thereto, which tape extends into the recess 4 and is bent therein in a loop 10, and extended from said recess below the pin 7 through the groove 6 into the recess 5 and partly around the periphery of a measuring wheel 11 journaled in the recess 5, the other end of said tape being secured to the periphery of said measuring wheel and bent outwardly at 12. A journal 13, upstanding from the bottom of the recess 5, is formed with a lower reduced end 14, which extends through the base 1 and is threaded to receive a nut 15, which engages the lower side of the base and draws the shoulder 16 of the journal formed between the journal proper and its reduced end 14, against the bottom of the recess 5, securing the journal in position in the center of the recess; there being a depending hub bearing 17 formed on the measuring wheel 11, which is slipped over said journal until the lower end of said bearing rests upon an end thrust bearing surface 18 formed on the bottom of the recess 5, whereby the measuring wheel is detachably journaled in said recess. The wheel 11 is formed at its upper end with a concentric circular turntable 19 which extends outwardly over the edge of the recess 5, and a stem 20 extends upwardly from the center of said turntable through the center of a circular measuring dial 21 which rests upon and is secured to said turntable. On the face of the dial 21 at the outer edge thereof is provided a circular scale 22, graduated into inches and two and one-half thousandths thereof, to measure the equivalent of a minimum of two inches or an unlimited maximum of six inches or more. The scale, however, is not limited to inches and fractions thereof, but may be graduated according to the metric or other systems.

A cover member 23 is placed on the base 1 over the dial 21, turntable 19, measuring wheel 11 and recess 5, and is secured at its corners to the base by screws 24, the upper wall of said cover being provided with an opening 25 through which the stem 20 extends and in which said stem turns, there being a knob 26 detachably secured on the upper end of said stem by a pin 27, said knob being formed with a pair of diametrically opposed arms 28 so that it may be grasped securely by one hand and turned for turning the measuring wheel 11, turntable 19 and dial 20. The cover member 23 is formed with a foot member 29 which covers the groove 6 outside of the cover, except that portion of the groove in which the pin 7 is located.

On the measuring wheel 11 is formed a lug 30 for engaging a stop 31 or a stop 32 formed on the wall of the recess 5, for limiting the turning movement of the measuring wheel to the left or right and determining the maximum and minimum sizes of the tape loop 10 and the circular objects to be measured therein.

Measure indicating means 33 comprises a sight opening 34, a magnifying glass 35 in said opening, and an indicating needle 36 under said opening and over the dial scale 22 pointing thereto. (See Figures 1, 3 and 4.) Said sight opening, magnifying glass and needle are located in a housing 37 at the rear of the cover member 23. The needle mounting and adjusting means illustrated in Figure 4 comprises a plate 38, an adjusting screw 39 and an adjustable block 40. The plate 38 is bent inwardly at one end at right angles in the form of a flange 41 and said flange is provided with a notch 42 to receive the screw 39, the head 43 of said screw engaging the outer side of said flange 41 and a collar 44 secured on said screw engaging the inner side of said flange, to allow said screw to turn but to hold it in said flange against longitudinal movement. The screw 39 engages a threaded opening 45 extending longitudinally into the adjustable block 40 from one end thereof, said block resting against the inner side of the plate 38. The needle 36 is secured at one end in the block 40, extending inwardly from said block over the outer edge of the dial 21. The plate 38 is secured against the outside of the rear wall of the housing 37 by screws 46 with the adjustable block 40 extending through an opening 47 in said rear wall and the needle 36 extending over the edge of the dial 21 and pointing to the scale 22. By turning the screw 39 the block 40 is moved one way or the other and the needle 36 is adjusted with relation to the scale 22 to set the needle for accurately reading the scale.

The wall of the recess 4 is formed with a straight surface 48, the surface 48 being a continuation of the lower side of the groove 6, against which surface the tape, with a circular object in the loop 10 thereof, is drawn at this point, when the tape is drawn by the measuring wheel tight around the object, thus positioning the object for accurate measurement with the tape extending at a tangent from the object through the groove 6 to the measuring wheel. This positioning of the object by said surface 48 has been found to give the most accurate results in measuring the object.

The operation, uses and advantages of the invention are as follows:

The tape loop 10 being expanded sufficiently, a circular object, such as a piston ring 50, is placed within said loop in the recess 4. The knob 26 is then grasped by the hand and turned to the right, which likewise turns the measuring wheel 11, turntable 19 and dial 21 and winds the tape 9 on the measuring wheel until the tape is drawn tight around said piston ring and against the surfaces 48 and 49 of the recess 4, in which position the measure of the parts the measure of the piston ring is indicated through the magnifying glass 35 by the number on the scale 22 to which the needle 36 points, which measure, illustrated in Figure 1 of the drawings, is "four" and a small fraction of an inch.

I claim:

1. In a measuring instrument, a base formed with two recesses and a groove connecting said recesses, one of said recesses being formed with an abutting surface in continuation of one side of said groove, a tape connected at one end to said base at the juncture of said recess and the other side of said groove and said tape being formed in a loop in said recess and extending through said groove into said other recess, a measuring wheel journaled on said base in said other recess and said tape being wound on the periphery of said measuring wheel and secured at its other end to said wheel, means for turning said measuring wheel for drawing said loop of said tape tightly around an object and against said abutting surface, a measuring dial on said measuring wheel, and an indicator pointing to said measuring dial for indicating the circumferential measure of said object when said tape is drawn around the same and against said abutting surface.

2. In a measuring instrument, as characterized by claim 1, a plate covering said measuring wheel and secured to said base, said plate being formed with a sight opening for viewing said indicator and measuring dial, and a magnifying glass in said sight opening.

3. A measuring instrument, as characterized by claim 1, in which the abutting surface in continuation of one side of the groove is straight.

RALPH JACOB MARVIN.